(12) United States Patent
Zeng et al.

(10) Patent No.: US 7,865,727 B2
(45) Date of Patent: Jan. 4, 2011

(54) AUTHENTICATION FOR DEVICES LOCATED IN CABLE NETWORKS

(75) Inventors: Shengyou Zeng, Concord, MA (US); Jason Frazier, Raleigh, NC (US); Joshua B. Littlefield, Wellesley, MA (US); Joseph A. Salowey, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 940 days.

(21) Appl. No.: 11/467,002

(22) Filed: Aug. 24, 2006

(65) Prior Publication Data

US 2008/0065883 A1 Mar. 13, 2008

(51) Int. Cl.
*H04L 9/00* (2006.01)
*G06F 21/00* (2006.01)

(52) U.S. Cl. ............................ 713/168; 726/3; 726/4; 726/5; 726/6; 726/7; 725/111

(58) Field of Classification Search ............... 713/168; 725/111; 726/2–7
See application file for complete search history.

(56) References Cited

U.S. PATENT DOCUMENTS

| | | | |
|---|---|---|---|
| 5,918,019 | A | 6/1999 | Valencia |
| 6,028,933 | A | 2/2000 | Heer et al. |
| 6,049,826 | A | 4/2000 | Beser |
| 6,058,421 | A | 5/2000 | Fijolek et al. |
| 6,137,793 | A | 10/2000 | Gorman et al. |
| 6,170,061 | B1 | 1/2001 | Beser |
| 6,189,102 | B1 | 2/2001 | Beser |
| 6,202,081 | B1 * | 3/2001 | Naudus ............ 709/200 |
| 6,219,790 | B1 | 4/2001 | Lloyd et al. |
| 6,819,682 | B1 | 11/2004 | Rabenko et al. |
| 6,986,157 | B1 | 1/2006 | Fijolek et al. |
| 6,996,714 | B1 | 2/2006 | Halasz et al. |
| 7,065,779 | B1 | 6/2006 | Crocker et al. |
| 7,099,338 | B1 | 8/2006 | Lee |
| 7,113,484 | B1 | 9/2006 | Chapman et al. |
| 7,114,070 | B1 | 9/2006 | Willming et al. |
| 7,139,923 | B1 | 11/2006 | Chapman et al. |
| 2002/0052927 | A1 | 5/2002 | Park |

(Continued)

FOREIGN PATENT DOCUMENTS

WO 00/72509 11/2000

(Continued)

OTHER PUBLICATIONS

Federal Information Processing Standards Publication 198: The Keyed-Hash Message Authentication Code (HMAC) Mar. 6, 2002 pp. 1-20.*

(Continued)

*Primary Examiner*—Nasser Moazzami
*Assistant Examiner*—Lisa Lewis
(74) *Attorney, Agent, or Firm*—Stolowitz Ford Cowger LLP

(57) ABSTRACT

An extensible authentication framework is used in cable networks such as Data Over Cable Service Interface Specification (DOCSIS) cable networks. The authentication scheme allows for centralized authentication of cable modems, as well as authentication of the cable network by cable modems. Additionally, the authentication scheme allows a Cable Modem Termination System (CMTS) to authenticate devices downstream from cable modems, such as Customer Premise Equipment (CPE) devices.

13 Claims, 13 Drawing Sheets

U.S. PATENT DOCUMENTS

| | | | |
|---|---|---|---|
| 2002/0093955 | A1 | 7/2002 | Grand et al. |
| 2002/0131403 | A1 | 9/2002 | Desai et al. |
| 2002/0131426 | A1 | 9/2002 | Amit et al. |
| 2002/0133618 | A1 | 9/2002 | Desai et al. |
| 2002/0136203 | A1 | 9/2002 | Liva et al. |
| 2002/0141585 | A1 | 10/2002 | Carr |
| 2003/0105959 | A1 | 6/2003 | Matyas, Jr. et al. |
| 2003/0172090 | A1 | 9/2003 | Asunmaa et al. |
| 2003/0188195 | A1 | 10/2003 | Abdo et al. |
| 2004/0078571 | A1 | 4/2004 | Haverinen |
| 2004/0163129 | A1 | 8/2004 | Chapman et al. |
| 2004/0244043 | A1 | 12/2004 | Lind et al. |
| 2005/0005154 | A1* | 1/2005 | Danforth et al. ............ 713/200 |
| 2005/0064845 | A1 | 3/2005 | Clingerman et al. |
| 2005/0172117 | A1 | 8/2005 | Aura |
| 2005/0210252 | A1 | 9/2005 | Freeman et al. |
| 2005/0265376 | A1 | 12/2005 | Chapman et al. |
| 2005/0265392 | A1 | 12/2005 | Chapman et al. |
| 2005/0265397 | A1 | 12/2005 | Chapman et al. |
| 2006/0168612 | A1 | 7/2006 | Chapman et al. |
| 2007/0192500 | A1* | 8/2007 | Lum .......................... 709/230 |

FOREIGN PATENT DOCUMENTS

| | | |
|---|---|---|
| WO | 2007143312 | 12/2007 |

OTHER PUBLICATIONS

B. Aboba, et al., Extensible Authentication Protocol (EAP), Standards Track, Jun. 2004, pp. 1-64, Request For Comments 3748.

Cable Television Laboratories, Inc., Data-Over-Cable Service Interface Specifications, DOCSIS 1.1, Aug. 12, 2005, pp. 1-184, Technical Specification.

Postel, J., "User Datagram Protocol", RFC 768, Aug. 28, 1980, 3 pgs.

Postel, Jon, Editor, "DARPA Internet Program Protocol Specification", RFC 791, Sep. 1981, 45 pages.

Deering, S., "Host Extensions for IP Multicasting", RFC 1112, Aug. 1989.

Droms, R., "Dynamic Host Configuration Protocol", RFC 2131, Mar. 1997.

Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC 3315, Jul. 2003.

Droms, R., "Stateless Dynamic Host Configuration Protocol (DHCP) Service for IPv6", RFC 3736, Apr. 2004.

Chapman, John T., "CMTS Remote PHY for a DOCSIS Network: DMPI Over IP Protocol Specification", RP-SP-DoIP-D1-040715B. doc, Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Ramakrishnan, Sangeeta, "Next Generation Edge—Realizing the vision of shared resources and bandwidth", SCTE Conference on Emerging Technologies, Jan. 11-13, 2005, 16 pgs.

Chapman, John T., "Remote PHY Technical White Paper Addendum," Downstream External PHY Interface Specification, Cisco Systems, Inc., EDCS-377253, Jan. 24, 2005.

Cisco Systems, Inc., "Downstream External PHY Interface Specification", SP-DEPI-W2-041101A.DOC, EDCS-408926, Jan. 25, 2005.

Lau, J., et al., "Layer Two Tunneling Protocol—Version 3 (L2TPv3)," RFC 3931, Mar. 2005, 94 pages.

Cable Television Laboratories, Inc., "DOCSIS Radio Frequency Interface Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs-Research, pp. 1-13.

Adoba, et al., Extensible Authentication Protocol (EAP), RFC 3748, Jun. 2004, pp. 1-64, Standards Track.

ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.

Rigney, C., et al., "RADIUS Accounting", Network Working Group, Request for Comments: 2866, Jun. 2000, 28 p.

Rigney, C., et al., "Remote Authentication Dial in User Service (RADIUS)", Network Working Group, Request for Comments: 2865, Jun. 2000, 76 p.

T. Dierks and C. Allen, "The TLS Protocol, Version 1.0", Jan. 1999, http://www.ietf.org/rfc/rfc2246.txt.

S. Blake-Wilson et al., "Transport Layer Security (TLS) Extensions", Jun. 2003, http://www.ietf.org/rfc/rfc3546.txt.

International Search Report for International Patent Application No. PCT/US07/68105 dated Feb. 27, 2008, 3 pages.

Stolowitz Ford Cowger LLP, Listing of Related Cases, Jan. 13, 2010.

\* cited by examiner

Background

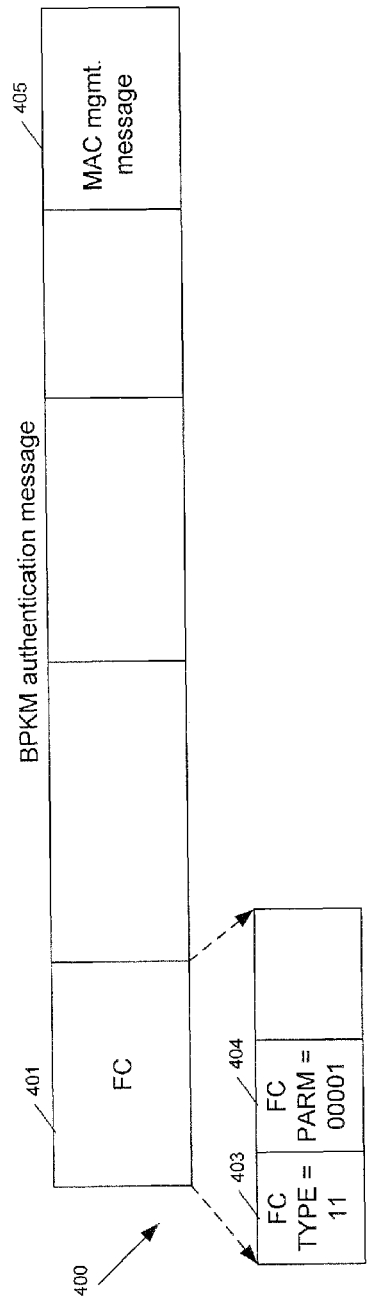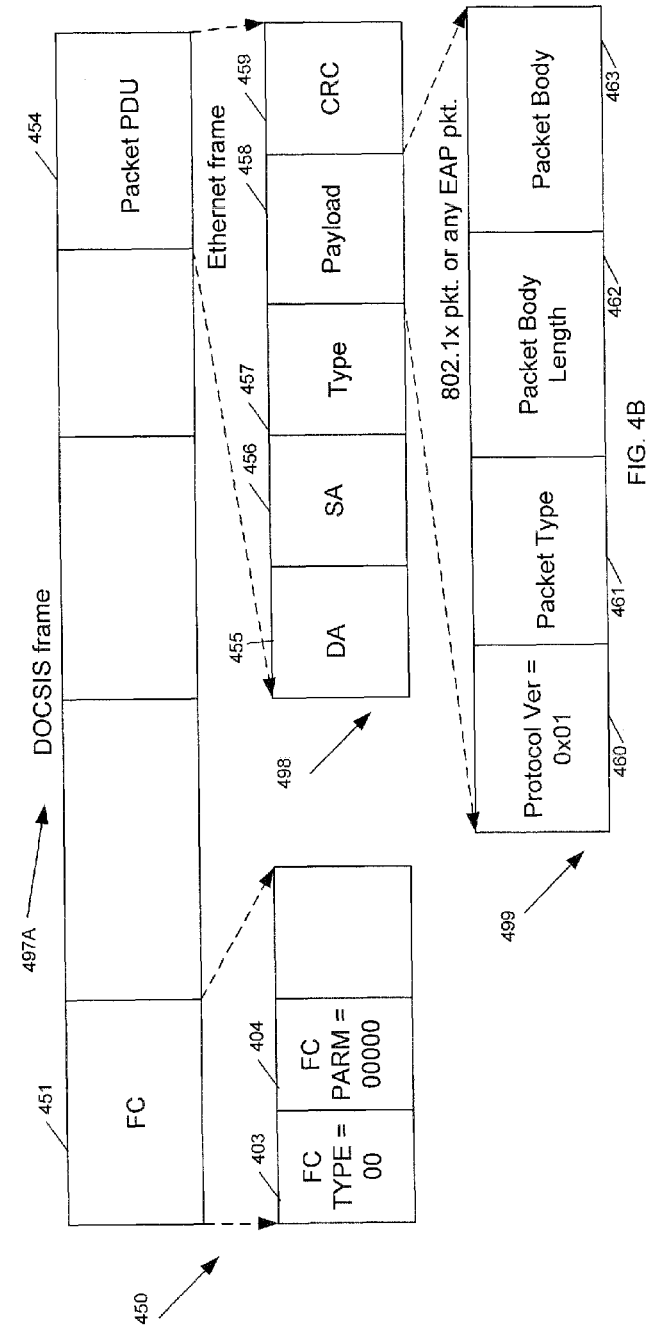
FIG. 4A
FIG. 4B

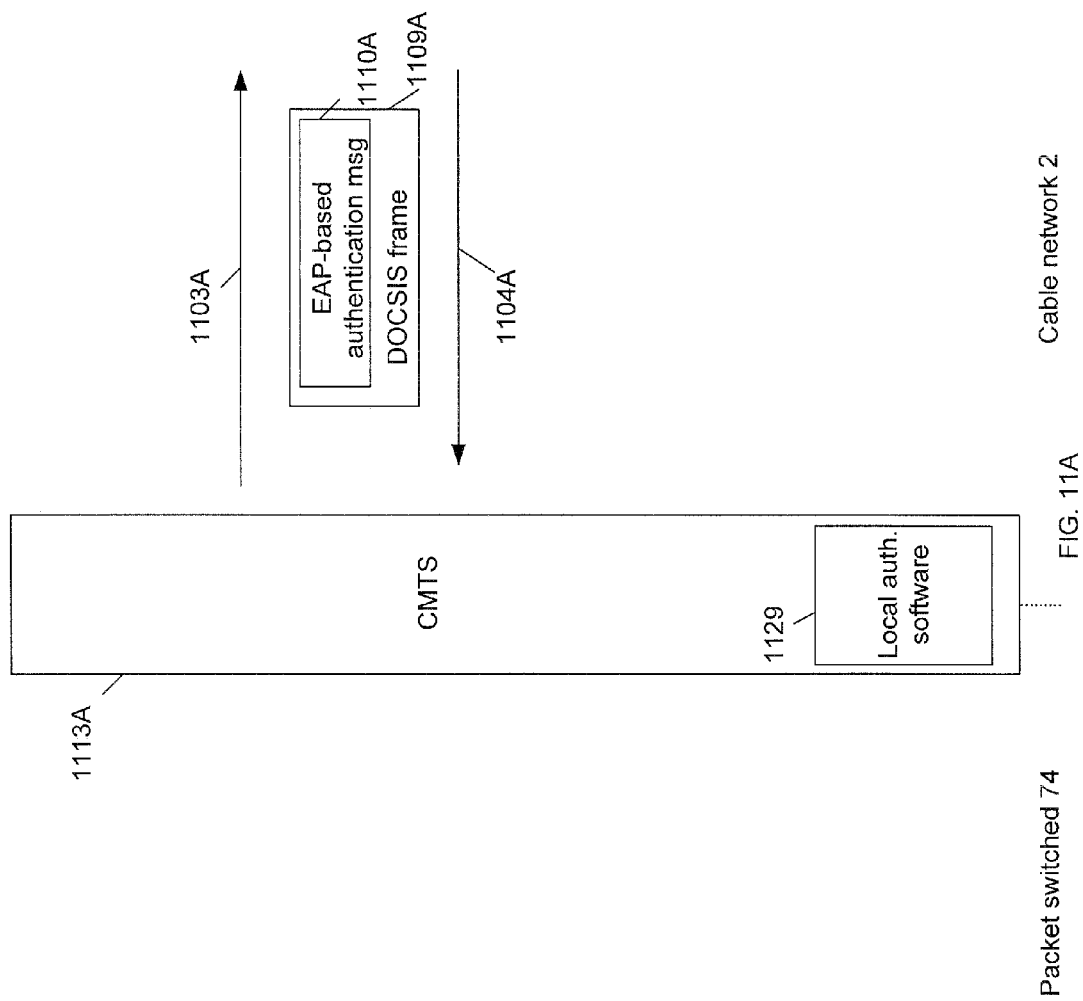

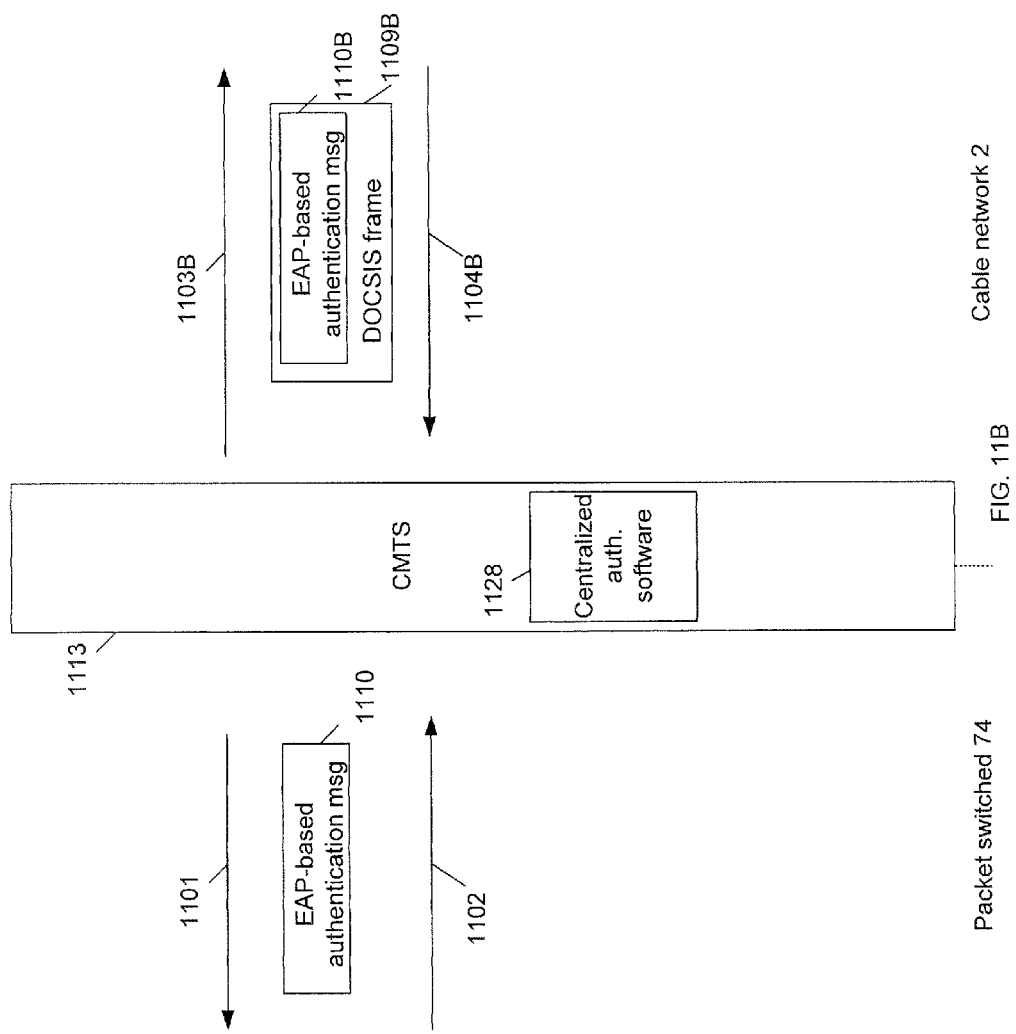

AUTHENTICATION FOR DEVICES LOCATED IN CABLE NETWORKS

BACKGROUND

Cable modems provide broadband services over cable networks by communicating with a Cable Modem Termination System (CMTS, or "head-end"). Cable modems are located in end users' premises.

Cable networks generally authenticate cable modems to ensure, in part, that an end user using a cable modem is a paying customer. FIG. 1 shows a conventional cable modem Base Line Interface Plus (BPI+) authentication scheme used in Data Over Cable Service Interface Specification (DOCSIS) systems.

Referring to FIG. 1, a Cable Modem (CM) 4 located in cable network 2 uses the Baseline Privacy Key Management (BPKM) protocol to send an Authorization Request 6 that includes the cable modem's identity attribute 5. The identity attribute 5 is based on an X.509 certificate and a concatenation of a Media Access Control (MAC) address, a serial number, a manufacturer identification and an Rivest Shamir Adleman (RSA) public key for the cable modem 4. The Authorization Request 6 may be sent after registration of the cable modem 14.

After receiving the authorization request 6, a CMTS 3 authenticates the cable modem 4 by validating the X.509 certificate in the identity attribute 5 using a certificate chain provisioned in the local memory of the CMTS. When the cable modem 4 is authorized for cable service, the CMTS 3 uses the BPKM protocol to send back an Authorization Reply 8 that includes a locally generated Authorization Key 7. Lifetime information and ciphersuite information for the Authorization Key 7 are included in the Authorization Reply 8.

The BPI+ authentication scheme shown in FIG. 1 has limitations. For example, the cable modem 4 does not authenticate the CMTS 3, meaning that a cable modem user is vulnerable to a fraudulent network device. Also, BPI+ does not allow the authentication of cable modems to be centralized for the cable network. In other words, all CMTSs include local resources to locally authenticate downstream cable modems. Also, when authentication of the cable modem occurs after registration of the cable modem, the cable modem authentication is vulnerable to a security exploit that involves modifying the cable modem's configuration value. Moreover, the sequence of authentication exchanges is predefined, non-negotiable and otherwise fixed in BPI+. For these and other reasons, an improved remote and extensible authentication system for cable networks is needed as cable networks increase in size.

SUMMARY

An extensible authentication framework is used in cable networks such as Data Over Cable Service Interface Specification (DOCSIS) cable networks. The authentication scheme allows for centralized authentication of cable modems, as well as authentication of the cable network by cable modems. Additionally, the authentication scheme allows a Cable Modem Termination System (CMTS) to authenticate devices downstream from cable modems, such as Customer Premise Equipment (CPE) devices.

BRIEF DESCRIPTION OF THE DRAWINGS

FIGS. 4A and 4B are detailed diagrams comparing frame structure for the improved authentication protocol used by the CMTS in FIG. 2 to that in the DOCSIS BPKM protocol.

FIGS. 11A and 11B are detailed diagrams showing an alternate embodiment of a CMTS that provides improved authentication for devices located in cable networks.

DETAILED DESCRIPTION

Figure 1:
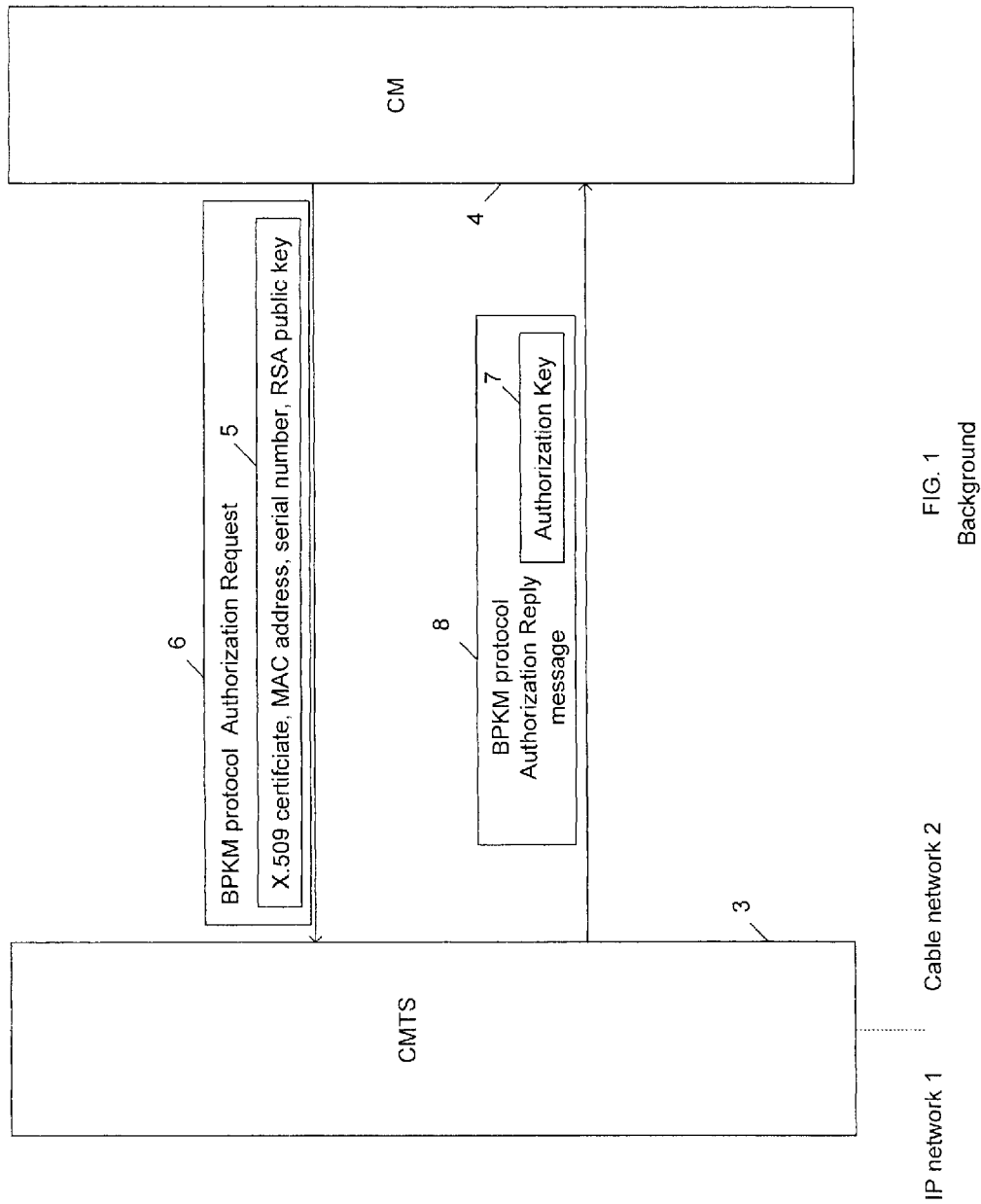
FIG. 1 is a background diagram showing a CMTS authenticating a cable modem.

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

Figure 2:
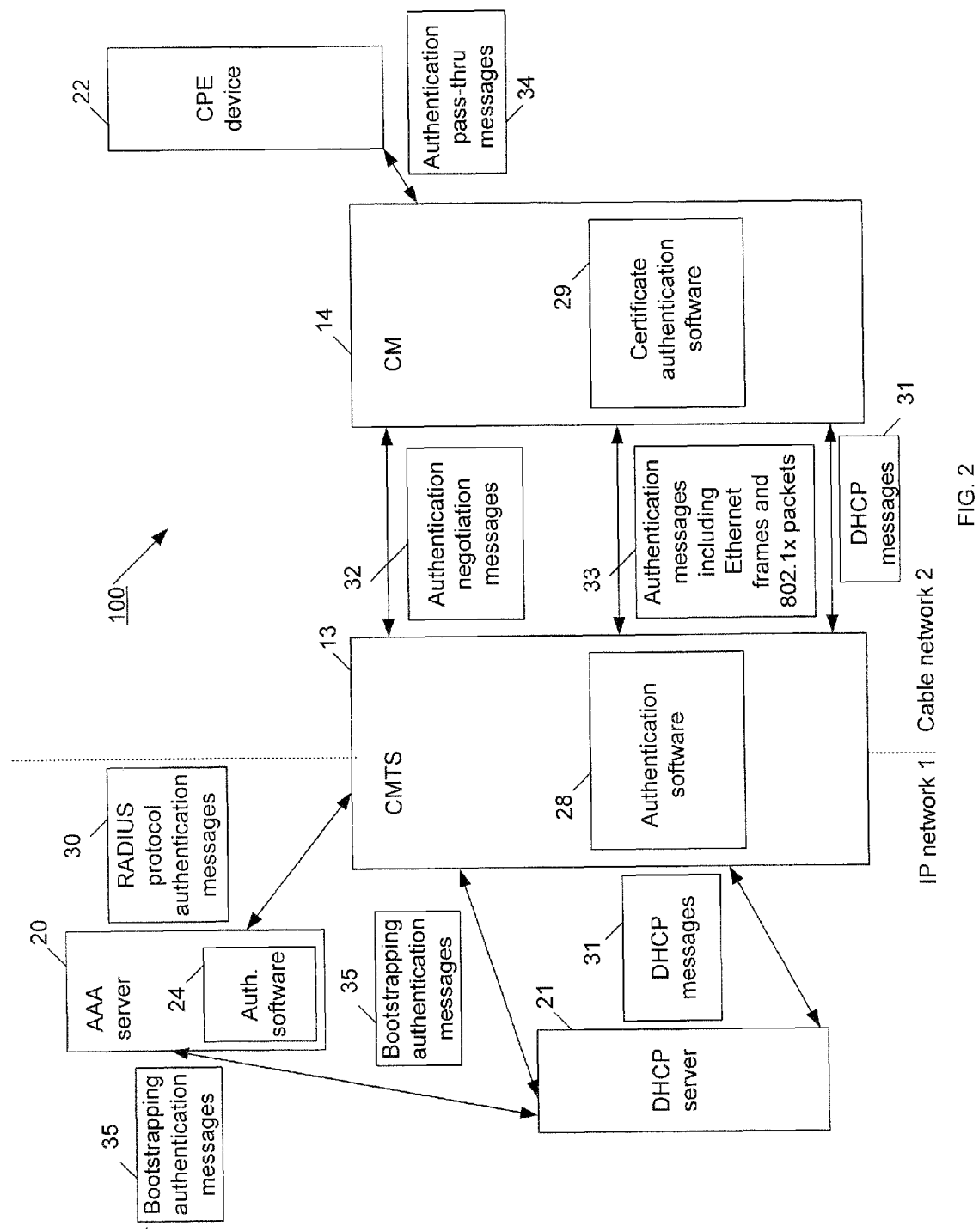
FIG. 2 is a diagram showing one embodiment of a system that provides improved authentication of a cable modem and a CPE device.

FIG. 2 is a diagram showing one embodiment of a system 100 that uses an Extensible Authentication Protocol (EAP) framework in a Data Over Cable Service Interface Specification (DOCSIS) network. Accordingly, the system 100 allows for centralized authentication of cable modems, cable modem authentication of network devices and many other features.

Several differences are immediately apparent when comparing FIGS. 1 and 2. First, the Cable Modem Termination System (CMTS) 13 includes authentication software 28 for exchanging Remote Authentication Dial In User Service (RADIUS) protocol authentication messages 30 with Authentication Authorization and Accounting (AAA) server 20 located in Internet Protocol (IP) network 1. As a result, the authentication workload for multiple CMTSs can be offloaded to one or more centralized AAA servers 20 for improved network scaling. Although some embodiments allow for centralized authentication at the AAA servers 20 according to authentication software 24 located on AAA servers 20, other embodiments provide local authentication at the CMTS 13.

Second, the cable modem 14 includes certificate authentication software 29 for authenticating a network device such as a CMTS 13 or an AAA server 20. Thus, in contrast to conventional systems, the cable modem 14 verifies that the authenticator is genuine.

Third, a conventional Customer Premise Equipment (CPE) 22 running 802.1x supplicant or other EAP-based authentication software may be authenticated by either the CMTS 13 or the AAA server 20 by way of authentication pass-thru messages 34 relayed by the cable modem 14. Thus, downstream devices such as CPE device 22 can be authenticated in addition to cable modems.

Fourth, the CMTS 13 or the AAA server 20 can use bootstrapping authentication messages 35 to distribute cryptographic keys shared between the cable modem 14 and servers such as the Dynamic Host Configuration Protocol (DHCP) server 21. Such distribution allows the DCHP server 21 to authenticate DHCP messages 31 sent between the cable modem 14 and the DHCP server 21, further improving the security of the cable modem initialization process.

Fifth, the authentication messages 33 include Ethernet frames containing EAP-based protocol packets such as 802.1x packets instead of BPKM protocol messages. As will be explained in greater detail with reference to FIGS. 3, 4A and 4B, this configuration leverages existing constructs, such as DOCSIS frames defined in the existing DOCSIS specifications.

Sixth, the CMTS 13 and the cable modem 14 may exchange authentication negotiation messages 32. These negotiation messages 32 allow an authenticator and a supplicant to negotiate authentication methods, i.e., sequences of authentication exchanges. For example, the negotiation messages 32 may modify a predetermined sequence of exchanges to include additional exchanges for a cable modem security posture assessment. In addition to allowing sequence customization, the negotiation messages 32 also allow the authenticator and the supplicant to change or add criteria used during authentication For example, when a network device that does not include certificates (such as a Personal Computer (PC)) requests authentication, the negotiation messages 32 are used to define authentication based on a shared secret or a one time password instead of a certificate.

Figure 3:
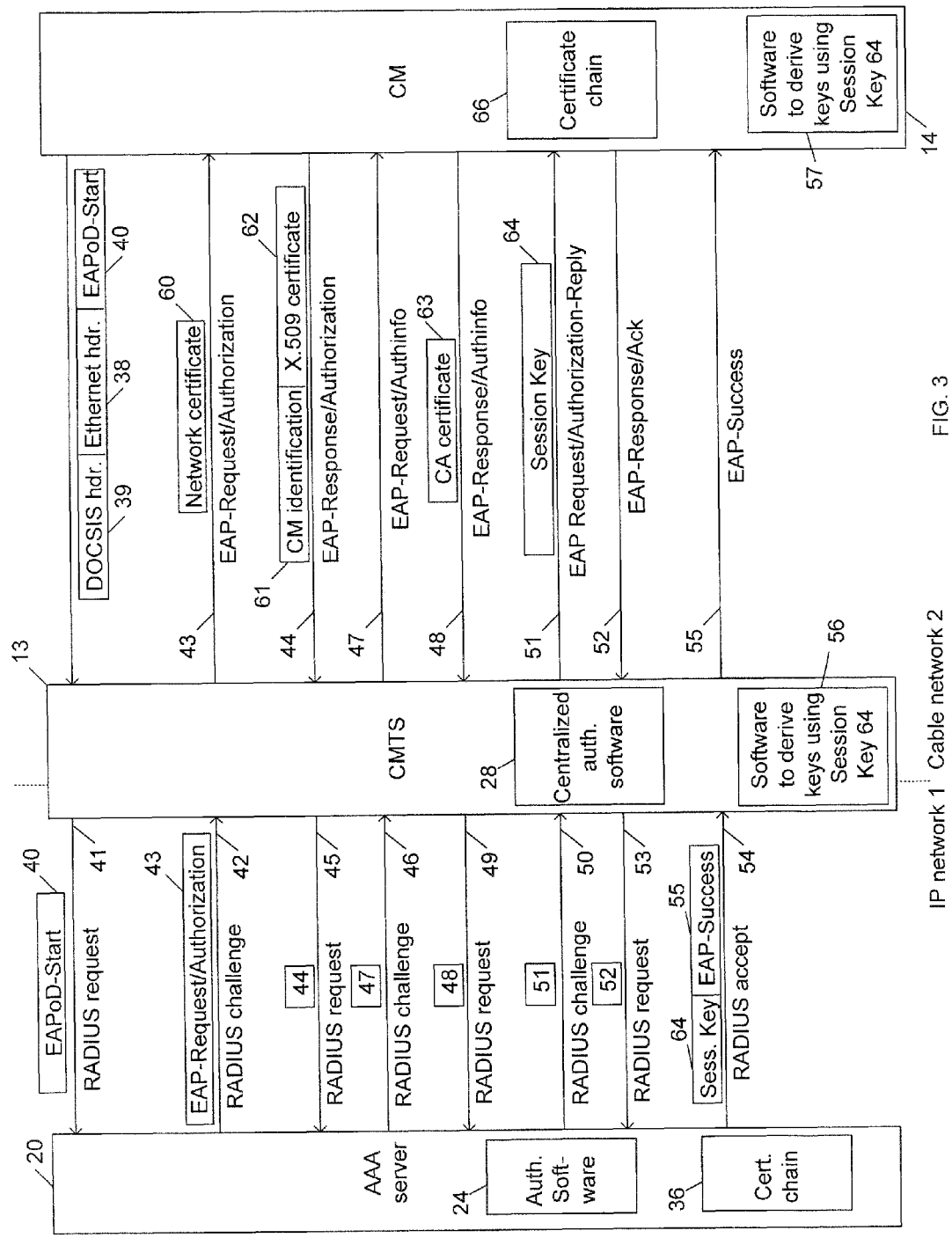
FIG. 3 is a detailed diagram showing how a CMTS authenticates the cable modem in FIG. 2 using a centralized AAA server.

FIG. 3 is a detailed diagram showing communications exchanged between the CMTS 13, the cable modem 14 and the AAA server 20 shown in FIG. 2 during centralized authentication.

The cable modem 14 may trigger the authentication process by sending a start message 40, which may be an EAP-over-DOCSIS (EAPoD) type message or any other type of message. In the present embodiment the EAPoD-Start 40, as well as the other communications exchanged between the CMTS 13 and the cable modem 14, is encapsulated in an Ethernet frame having Ethernet header 38 which in turn is encapsulated in a DOCSIS frame having DOCSIS header 39. This unique structure allows the 802.1x protocol, as well as other EAP-based protocols, to be used in the system 100 according to the conventional DOCSIS protocol specification. The DOCSIS/Ethernet/802.1x structure that is compatible with the existing DOCSIS specification will be described in greater detail with reference to FIGS. 4A and 4B.

Still referring to FIG. 3, the CMTS 13 strips one or more headers and encapsulates the EAPoD-Start 40 in a RADIUS request 41 that is sent to an AAA server 20 according to authentication software 28. In other embodiments, the request 41 may be encapsulated in Diameter or any other protocol used by AAA server 20.

The AAA server 20 is referred to as a centralized server because the AAA server 20 may authenticate cable modems downstream from multiple CMTSs. Although the centralized authentication server 20 is an AAA type in this embodiment, other types may be used.

Figure 9:
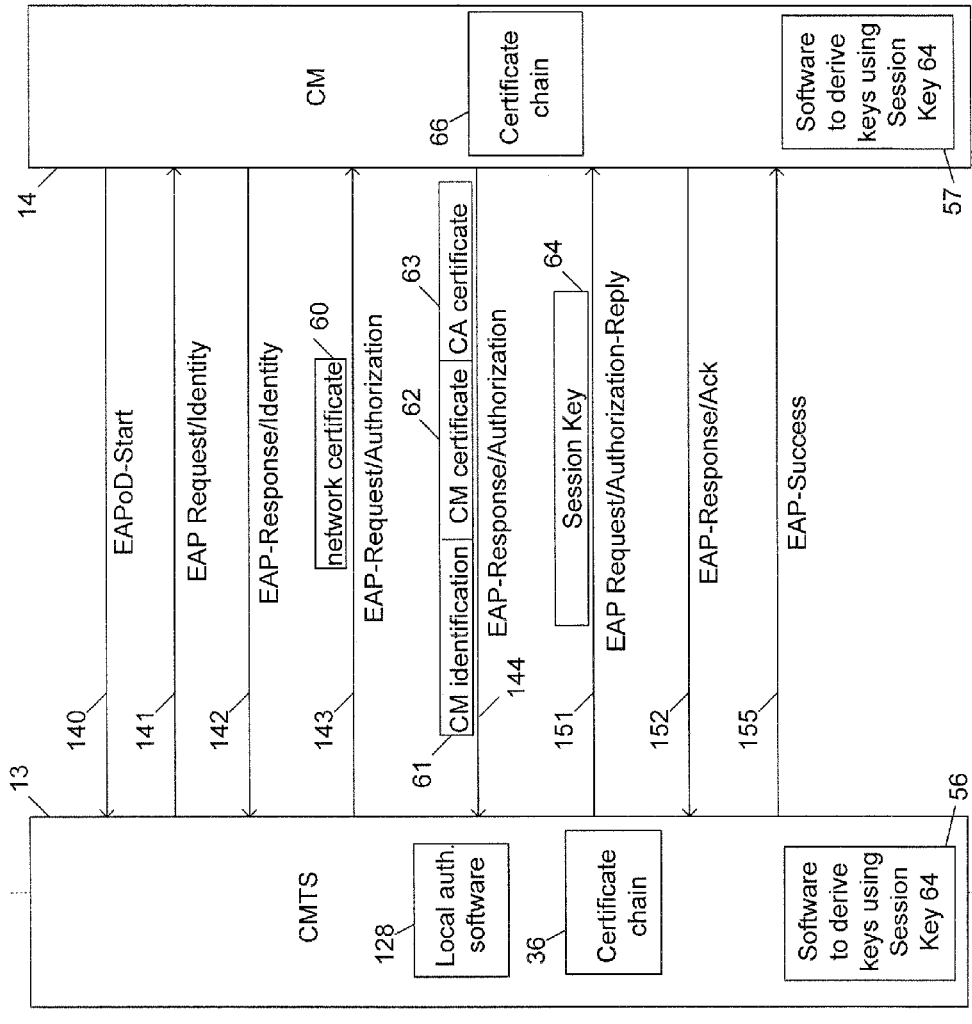
FIG. 9 is a detailed diagram showing how the CMTS in FIGS. 2 and 5 independently authenticates the cable modem in FIG. 2.

As an optional exchange, after receiving the EAPoD-Start 40, the AAA server 20 may request an identity for the cable modem 14, particularly when the EAPoD-Start 40 does not include an attribute containing the MAC address for the cable modem 14 or when the EAPoD-Start 40 is omitted. For brevity, this optional exchange is not shown in FIG. 3; however, FIG. 9 shows such an example of such an optional exchange. After the optional exchange, or when the optional exchange is skipped, the AAA server 20 sends RADIUS challenge 42 in response to the EAPoD-Start 40.

Next, the CMTS 13 receives back the RADIUS challenge 42, which includes an EAP Request/Authorization 43 containing network certificate 60. In the present embodiment, the network certificate 60 is an X.509 type provided by the AAA server 20. In other embodiments, the network certificate 60 may be any type and provided by the AAA server 20, the CMTS 13 or any other network device. The CMTS 13 strips the RADIUS encapsulation, and encapsulates according to the previously described unique DOCSIS/Ethernet/802.1x protocol.

The message "EAP-Request/Authorization" 43 contains the network certificate 60 and is forwarded to the cable modem 14. One of ordinary skill in the art will understand the syntax "EAP-Request/Authorization" to refer to a specific type of EAP message. In other words, the "/" does not represent an "or" when used to refer to EAP messages. In other embodiments, any communication may be used to send the network certificate 60. Since authentication by the cable modem 14 is optional, in other embodiments the EAP-Request/Authorization 43 may not include the network certificate 60.

Although the CMTS 13 forwards the EAPoD-Start 40 and EAP-Request/Authorization 43 in the present embodiment, other embodiments may include the CMTS 13 itself processing the EAPoD-Start 40 and generating the EAP-Request/Authorization 43. In other words, in these other embodiments the CMTS 13 does not involve the AAA server 20 until after receiving authentication criteria from the cable modem 14.

To summarize up to this point, when the cable modem 14 initiates the authentication, the EAPoD-Start 40 is sent to elicit EAP-Request/Authorization 43. Regardless of whether the cable modem 14 initiates the authentication process, this authentication process typically occurs either after registration of the cable modem 14 or preferably immediately after ranging. The advantage of performing authentication before registration and immediately after ranging is to prevent a security exploit. In other embodiments, authentication occurs after registration.

Next, the cable modem 14 validates the network certificate 60 with an X.509 certification chain 66 rooted at the DOCSIS Root CA certificate stored in the cable modem 14. When the network certificate 60 fails validation, the cable modem 14 may alert a user of the failed validation. In other embodiments, the cable modem 14 may discontinue the authentication process due to the failed validation of the network certificate 60. In still another embodiment, the cable modem 14 may bypass validating the network certificate 60.

Additionally, and optionally, the cable modem 14 may authenticate the networks 1 and 2 represented by the authenticator (the AAA server 20 in this example). To perform this additional authentication, the cable modem 14 determines whether the AAA server 20 possesses a private key corresponding to a public key included in the network certificate 60. The cable modem 14 may perform this check using any mechanism or process for demonstrating possession of the private key.

When the network certificate 60 is successfully validated, the cable modem 14 continues the authentication process by sending an EAP-Response/Authorization 44 back to the CMTS 13. The EAP-Response/Authorization 44 includes cable modem identification 61, a cable modem X.509 certificate 62, and may include the optional challenge for network authentication. The cable modem identification 61 and certificate 62 contain values such as a Media Access Control (MAC) address, a serial number and an RSA public key for the cable modem 14. The EAP-Response/Authorization 44 is received by the CMTS 13 and forwarded to the AAA server 20 in a similar manner as the previous messages.

After the AAA server 20 receives the RADIUS request 45 containing the EAP-Response/Authorization 44, the AAA server 20 performs validation by comparing the cable modem identification 61 and the X.509 certificate 62 to a locally stored certification chain 36. When the AAA server 20 does not locally store a complete certification chain 36, the AAA server 20 sends the optional RADIUS challenge 46 containing an EAP-Request/AuthInfo 47. RADIUS challenge 46 containing an EAP-Request/AuthInfo 47 may be used to request a manufacturer Certificate Authority (CA) certificate 63 from the cable modem 14, which the AAA server 20 can use to complete the certification chain 36. Alternatively, the optional RADIUS challenge 46 or another similar message may request any other authentication criteria, for example, any authentication criteria identified by the authentication negotiation messages 32 (FIG. 2).

When the optional RADIUS challenge 46 is sent, CMTS 13 forwards EAP-Request/AuthInfo 47 in the manner previously described. The CMTS 13 then receives back EAP-Response/AuthInfo 48 containing the CA certificate 63 and/or negotiated authentication criteria.

Next, the CMTS 13 forwards an optional RADIUS request 49 containing the EAP-Response/AuthInfo 48 with the manufacturer CA certificate 63 in the manner previously described. The AAA server 20 then combines the manufacturer CA certificate 63 together with a locally stored pre-provisioned DOCSIS Root CA certificate to form a complete certification chain. The AAA server 20 uses the complete certificate chain to validate the cable modem identification 61 and the cable modem X.509 certificate 62.

Regardless of whether the optional RADIUS messages 46 and 49 were sent, and after the AAA server 20 successfully validates the cable modem certificate 62, the AAA server 20 sends a RADIUS challenge 50 including a Session Key 64 in an EAP-Request/Authorization-Reply 51. When the cable modem 14 sends an optional challenge in EAP-Response/Authorization 44, RADIUS challenge 50 and EAP-Request/Authorization-Reply 51 contain a response to the optional challenge proving possession of the private key of the network certificate 60 by the network represented by the AAA server 20, completing network authentication by the cable modem.

The Session Key 64 may be encapsulated in an EAP-Message attribute of the RADIUS challenge 50. The Session Key 64 in the EAP-Message attribute may be encrypted by the public key of the cable modem X.509 certificate 62. In other embodiments, the Session Key is cryptographically computed at the cable modem 14 and accordingly EAP-Request/Authorization-Reply 51 does not contain the Session Key.

In the present embodiment, the Session Key 64 is equal to a randomly generated 64 byte value. Another key, called an Authorization Key, is derived from the Session Key 64. Specifically, the Authorization Key is equal to the first 20 bytes of the Session Key 64.

In other embodiments, the 64 byte Session Key 64 is established through different cryptographic processes. Also, in other embodiments, the Authorization Key may be based on other factors besides the first 20 bytes of the Session Key 64.

Next, the CMTS 13 forwards the EAP-Request/Authorization-Reply 51 including the encrypted Session Key 64 to cable modem 14. The cable modem 14 receives the EAP-Request/Authorization-Reply 51 and extracts the Session Key 64 by decrypting it using a local private key.

The cable modem 14 then acknowledges receipt of the EAP-Request/Authorization-Reply 51 by sending EAP-Response/Authorization-Ack 52. The cable modem 14 may also prove that it has successfully decrypted the Session Key by using a key derived from the Session Key 64 to generate a Message Authentication Code (MAC) which is included in the EAP-Response/Authorization-Ack 52. In the present embodiment, successful use of the Session Key completes authentication of the cable modem 14. The CMTS 13 then forwards RADIUS request 53 including EAP-Response/Authorization-Ack 52 to AAA server 20.

Finally, the AAA server 20 sends a RADIUS accept 54 that includes an EAP-Success message 55 and the Session Key 64. The CMTS 13 receives the RADIUS challenge 54 and extracts and stores the Session Key 64, which is subsequently used to cryptographically compute additional cryptographic keys used for ongoing bulk traffic protection and data encryption. The CMTS 13 sends the EAP-Success message 55 to the cable modem 14. Once the EAP exchanges complete, both the CMTS 13 and cable modem 14 may derive additional keys from the Session Key 64 according to software 56 and 57.

When any of the steps of the authorization exchange fail, the AAA server 20 notifies the CMTS 13 of this failure, and the CMTS 13 then sends an EAP-Failure to the cable modem 14. To protect against DOS attacks, the EAP-Success and EAP-Failure messages may be MAC-protected when key material is available.

When the authentication exchange is successful, the CMTS 13 changes the state of the cable modem's 14 logical port from the uncontrolled state to the controlled state. The result of the state change is that the cable modem 14 is no longer restricted to sending only authorization messages. In other words, the cable modem 14 is now able to send and receive media and other communications over the cable network 2. One functional result of the state change is that the cable modem 14 can now send and receive layer 3 communications over the cable network 2.

In other embodiments, the state of the logical port on the cable modem 14 may operate according to a multitude of different states besides just controlled and uncontrolled states. For example, the state of logical port may initially only be changed to a partially controlled state until further authentications are performed.

Although the above example describes authentication according to certificates, other example embodiments use various other authentication criteria. One of the features of the EAP framework is that it is extensible, which allows for authentication criteria negotiation. Thus, authentication can be according to other authentication criteria such as shared secrets, one time passwords, etc.

Referring now to FIG. 4A, a conventional Baseline Privacy Key Management (BPKM) authentication message 400 is shown so that it can be contrasted with the unique DOCSIS/Ethernet/802.1x configured message 450 (FIG. 4B) used for EAP-Over-DOCSIS authentication messages.

Like other DOCSIS MAC management messages, the conventional BPKM authentication message 400 includes a Frame Control (FC) header 401 with the FC type 403 and FC parameter 404 fields each set to binary 11 and 00001, respectively, in the MAC header. These fields, 403 and 404, signal a receiving device that the BPKM authentication message 400 includes a MAC management message 405. A field in the MAC management message 405 signals a receiving device that MAC management message 405 is a BPKM authentication message.

In contrast, the DOCSIS/Ethernet/802.1x structured message 450 includes an FC header 451 having the fields, 403 and 404, set to binary 00 and 00000. The binary settings in these fields 403 and 404 signal a receiving device that the message 450 includes a packet Protocol Data Unit (PDU) 454.

Included within the packet PDU 454 is a complete Ethernet frame 498 including destination address field 455 and source address field 456. The complete Ethernet frame 498 also includes a type field 457, a payload 458 and a Cyclic Redundancy Check (CRC) field 459. In this embodiment, the type field 457 is set to Ethernet type 0x888E to correspond with an IEEE 802.1x EAPOL (EAP Over LAN) packet; however, in other embodiments the type field 457 may be set differently.

Included within the payload 458 of Ethernet frame 498 is a complete 802.1x packet 499. In other embodiments a different protocol EAP-based packet may be included instead of 802.1x packet 499. The 802.1x packet 499 includes a protocol version field 460 identifying a version of 802.1x, a packet type field 461, a packet body length field 462 and a packet body 463. The packet body 463 is populated with the encrypted Session Key, the cable modem identification information, and the other information described in the authentication process shown in FIG. 3.

The unique configuration of the DOCSIS/Ethernet/802.1x message 450 allows the authentication improvements described herein to be backwards compatible with existing DOCSIS specifications such as DOCSIS 1.0, 1.1 and 2.0 and compatible with future version such as DOCSIS 3.0. Instead of updating the DOCSIS specification to redefine DOCSIS framing to contain EAP-based packets, the above-described Ethernet frame 498 has been included within a DOCSIS frame 497A.

Figure 5:
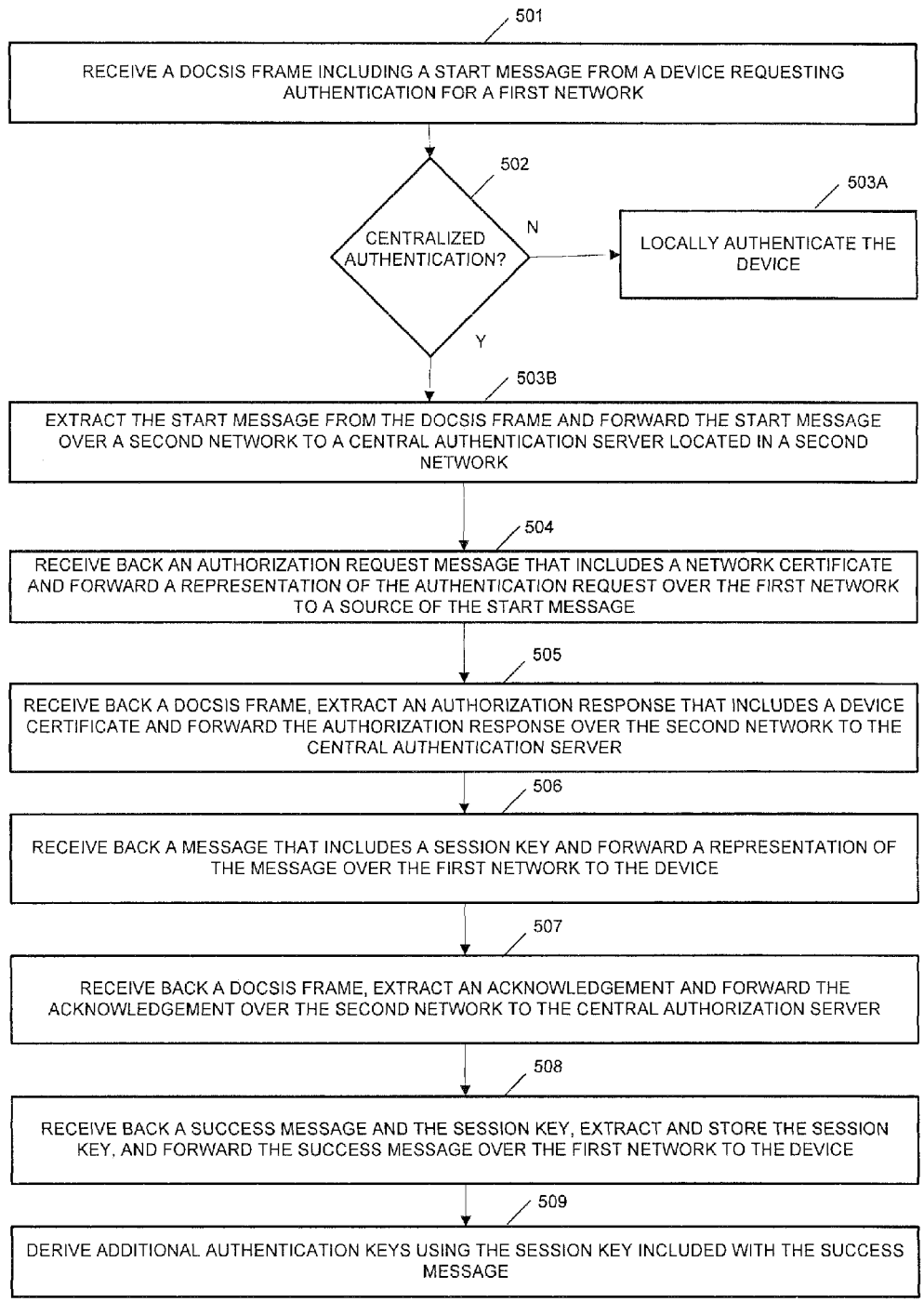
FIG. 5 is a flowchart showing how the CMTS in FIG. 2 provides authentication.

FIG. 5 is a flowchart showing how the CMTS 13 in FIG. 2 provides centralized authentication. In block 501, the CMTS 13 receives a DOCSIS frame including a start message from a device such as a cable modem or CPE requesting authentication for operation in a first network. Next, in block 502 the CMTS 13 determines whether it has been configured for centralized authorization. The CMTS 13 makes this determination, for example, by accessing a local configuration. When the CMTS 13 has been configured for local authorization instead of centralized authorization, the CMTS 13 locally authenticates the device in block 503A.

When centralized authorization is to be used, the CMTS 13 extracts the start message from the DOCSIS frame and forwards the start message over a second network to a centralized authorization server that is located in the second network in block 503B. The CMTS 13 may encapsulate the start message before forwarding.

Next, in block 504 the CMTS 13 receives back an authorization request message that includes a network certificate and forwards a representation of the authorization request over the first network to an origination source of the start message. In block 505, the CMTS 13 receives back a DOCSIS frame, extracts an authorization response, and forwards the authorization response over the second network to the central authentication server.

Next, the CMTS 13 receives back a message that includes an encrypted Session Key and forwards a representation of the message to the device in block 506. The forwarded message contains the encrypted Session Key for use by the cable modem. In block 507 the CMTS 13 receives back a DOCSIS frame, extracts an acknowledgement message and forwards the acknowledgement message to the central authentication server. Finally, in block 508 the CMTS 13 receives back a message that contains an EAP-success message and the Session Key. The CMTS 13 extracts the Session Key and forwards the success message to the device. The CMTS 13 may subsequently derive additional cryptographic keys using the Session Key in block 509.

Figure 6A:
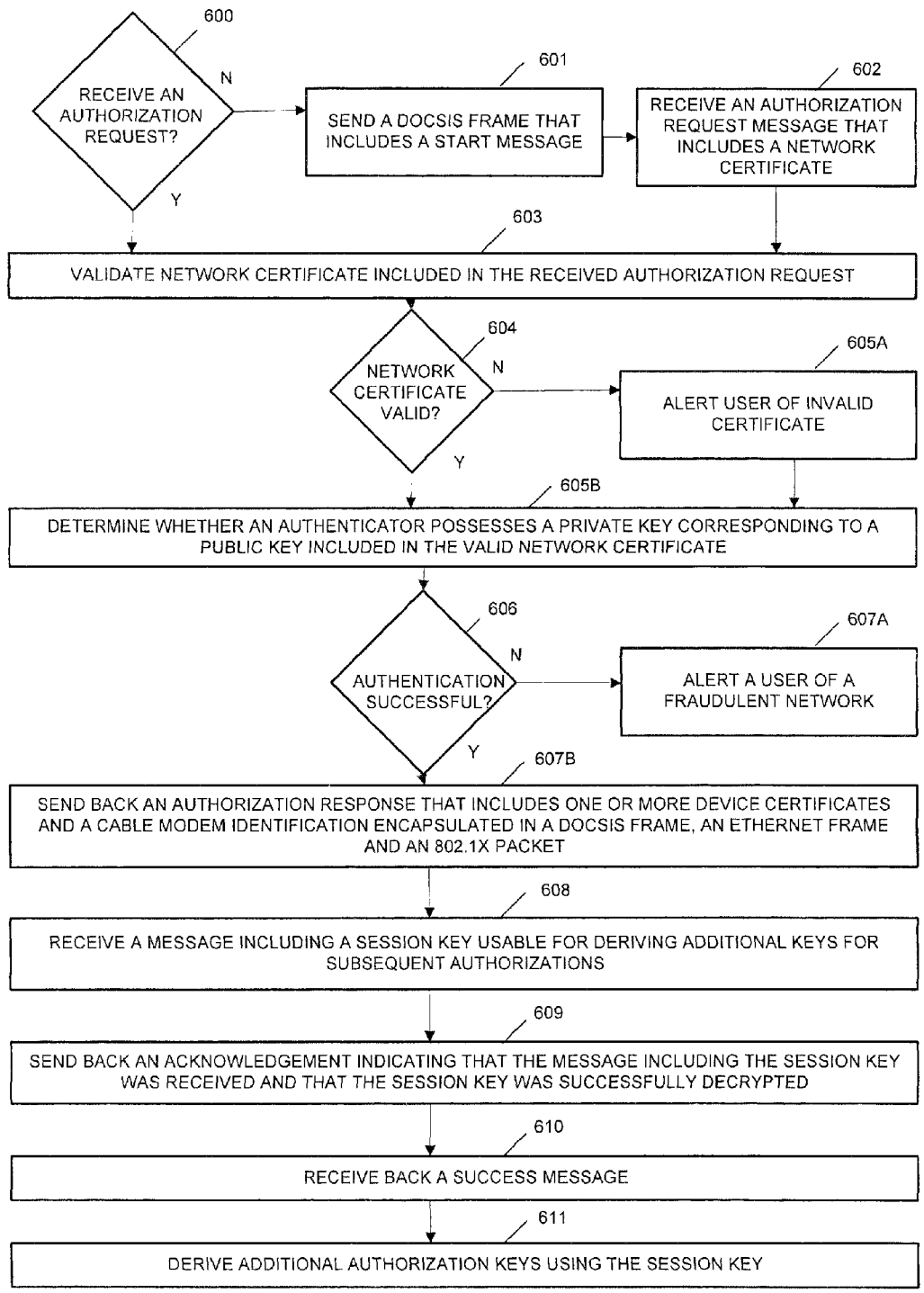
FIG. 6A is a flowchart showing how the cable modem in FIG. 2 authenticates the CMTS in FIG. 2.

FIG. 6A is a flowchart showing how the cable modem 14 in FIG. 2 validates a network certificate and authenticates a network device such as a CMTS or AAA server. In block 600, the cable modem 14 determines whether an authorization request has been received. When an authorization request has not been received, in block 601 the cable modem 14 sends a DOCSIS frame that includes a start message. Next, the cable modem 14 receives back an authorization request that includes a network certificate in block 602.

After receiving the authorization request, in block 603 the cable modem 14 validates the network certificate, for example, by using a pre-provisioned certification chain. When the network certificate is found to be invalid in block 604, the cable modem 14 alerts a user of an invalid certificate in block 605A. The cable modem 14 also may instead discontinue the process after receiving an invalid certificate.

When the network certificate is valid, in block 605B the cable modem 14 authenticates a network device such as a CMTS or AAA server. The cable modem 14 uses any method to authenticate the network device, such as determining whether the network device includes a private key corresponding to a public key included in the validated network certificate. When the network device fails authentication in block 606, the cable modem 14 alerts a user of a fraudulent network device in block 607A.

When the network device is found to be authentic, in block 607B the cable modem 14 sends back an authorization response that includes one or more device certificates and a cable modem identification. The authorization response is encapsulated in a DOCSIS frame which in turn encapsulates an Ethernet frame. In block 608, the cable modem 14 receives back a message including a Session Key.

In block 609 the cable modem 14 sends an acknowledgement indicating that the message including the Session Key was received and that the Session Key was successfully decrypted. This acknowledgement may contain proof the cable modem 14 knows the Session Key. The cable modem 14 receives back a success message indicating that its port will be changed from an uncontrolled state to a controlled state in block 610. The cable modem 14 may also derive additional cryptographic keys using the Session Key in block 609.

Figure 6B:
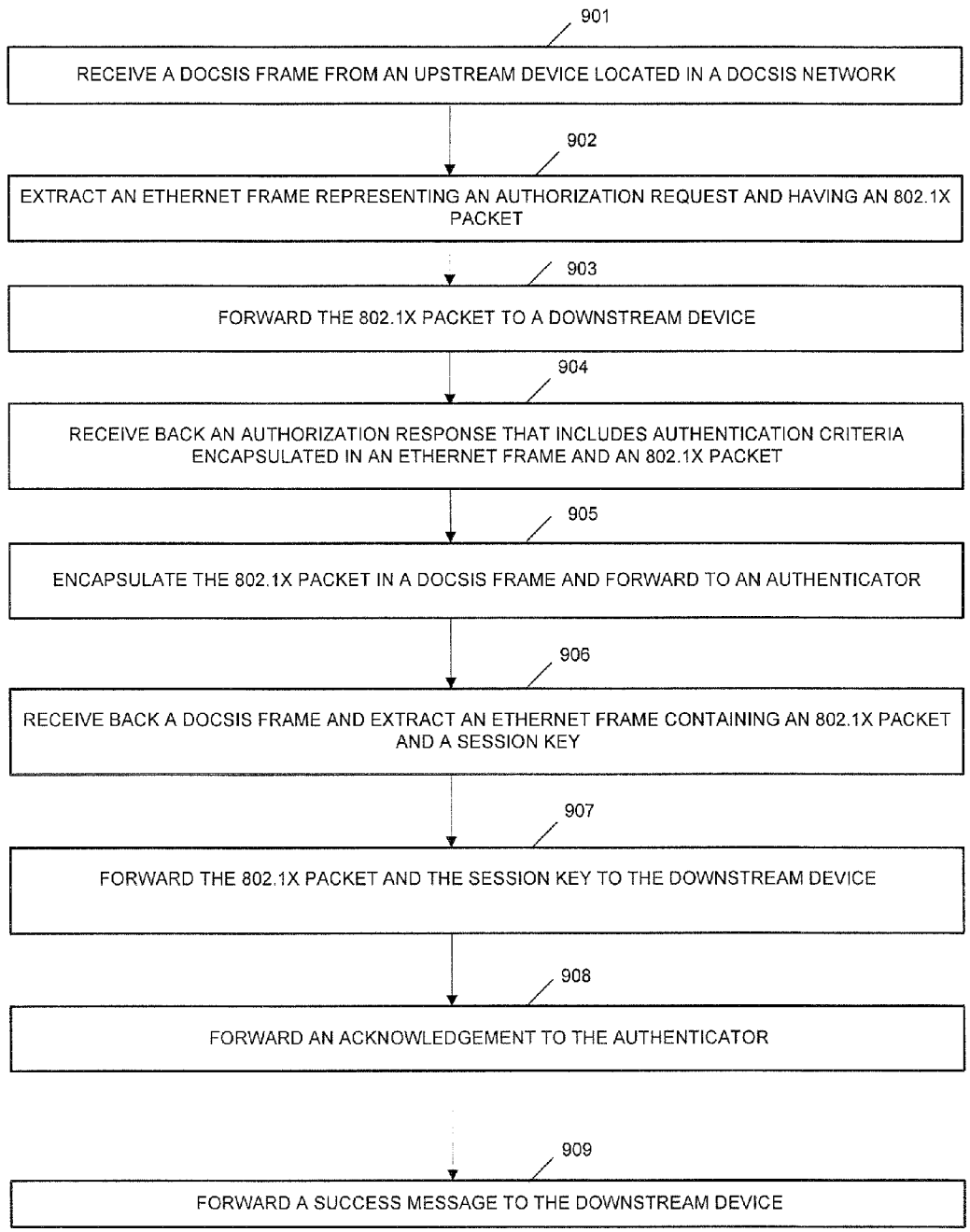
FIG. 6B is a flowchart showing how the cable modem in FIG. 2 relays authentication messages in the authentication of the downstream CPE device in FIG. 2.

FIG. 6B is a flowchart showing how the cable modem 14 in FIG. 2 relays authentication exchanges for the CPE device 22 shown in FIG. 2. In block 901, the cable modem 14 receives a DOCSIS frame from an upstream device located in a DOCSIS network. In block 902, the cable modem 14 extracts an Ethernet frame that represents an authorization request and that contains an 802.1x packet. The cable modem 14 forwards the extracted 802.1x packet to a downstream CPE device 22 in block 903.

Next, in block 904 the cable modem 14 receives back an authorization response that includes authentication criteria encapsulated in an Ethernet frame and an 802.1x packet. The authentication criteria may include one or more certificates when the downstream CPE device 22 has been assigned such certificates. Otherwise the authentication criteria include a non-certificate identifier, such as a MAC address for the downstream device. The cable modem 14 encapsulates the authorization response in a DOCSIS frame and forwards the DOCSIS frame to an authenticator in block 905.

Next, in block 906 the cable modem 14 receives back a DOCSIS frame and extracts an Ethernet frame containing an 802.1x packet with a Session Key, which may be encrypted. In other embodiments, the Session Key is cryptographically computed at the downstream CPE device 22 instead of relayed to the downstream CPE device 22. The cable modem 14 forwards the 802.1x packet to the CPE device in block 907. Finally, the cable modem 14 forwards an acknowledgement to the authenticator in block 908 and forwards a success message to the CPE device in block 909.

In other embodiments, the cable modem 14 may relay EAP messages for any EAP methods. In other embodiments, instead of just relaying authentication messages, the cable modem 14 itself authenticates the CPE device. The cable modem 14 may even be configurable to either alternately relay authentication messages or perform local authentication.

Figure 7:
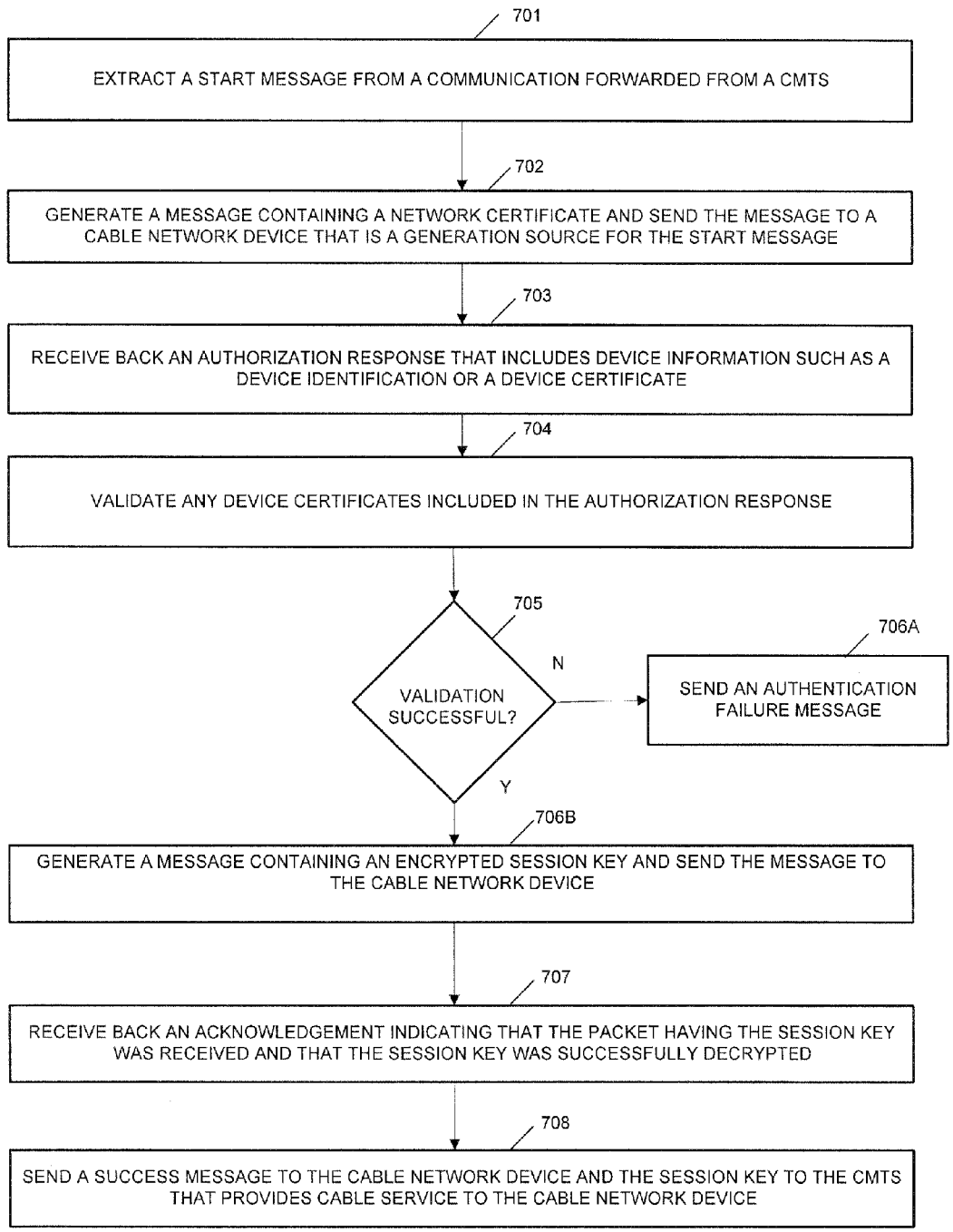
FIG. 7 is a flowchart showing how the AAA server in FIG. 2 authenticates the cable modem in FIG. 2.

FIG. 7 is a flowchart showing how the AAA server 20 in FIG. 2 authenticates the cable modem in FIG. 2. In block 701, the server 20 extracts a start message from a communication forwarded from a CMTS. Next, in block 702 the server 20 generates a message containing a network certificate and sends the message to a cable network device that is a generation source for the start message.

The server 20 receives back an authorization response that includes device information such as a device identification and a device certificate in block 703. In block 704, the server 20 validates any certificates included in the authorization response. When validation fails in block 705, the server 20 sends an authentication failure message in block 706A.

When validation is successful in block 706B, the server 20 generates a message containing an encrypted Session Key and sends the message to the cable network device. In block 707, the server 20 receives back an acknowledgement indicating that the message having the Session Key was received and that the Session Key was successfully decrypted. Finally, in block 708 the server 20 sends a success message to the cable network device and the Session Key to the CMTS.

Figure 8:
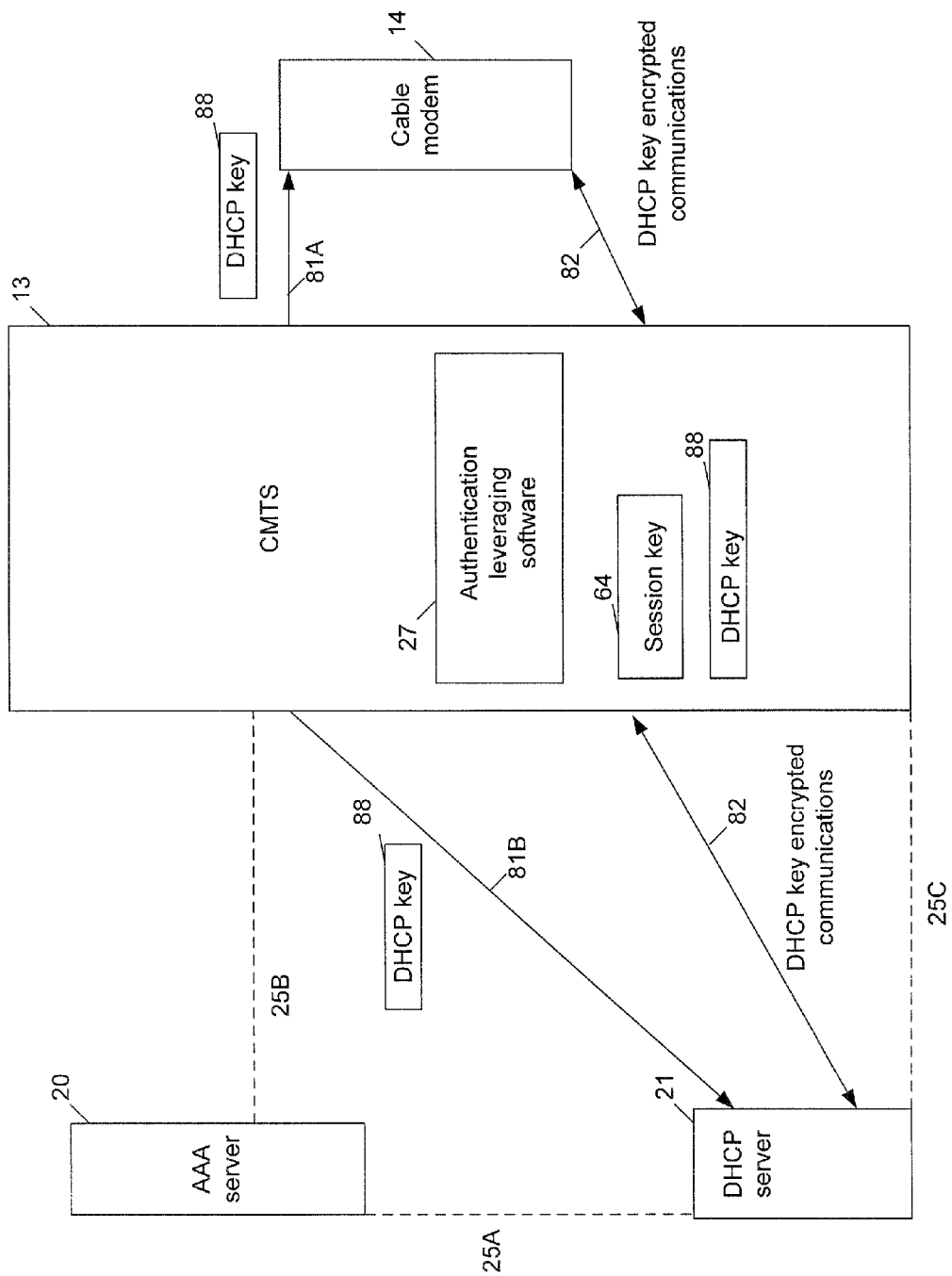
FIG. 8 is a detailed diagram showing how the CMTS in FIG. 2 leverages the improved authentication of the cable modem for DHCP authentication.

FIG. 8 shows authentication leveraging that may optionally be performed by the CMTS 13 after the Session Key 64 is generated.

The authentication leveraging software 27 may be executed to leverage the results of the authentication of the cable modem 14 on the CMTS 13 or the AAA server 20 for use by other network devices such as DHCP server 21. The AAA server 20 has trust relationships 25A and 25B with the DHCP server 21 and CMTS 13. Trust relationship 25C may be leveraged when the AAA server 20 is not present. The trust relationships 25A, 25B and 25C may be established in different ways. For example, the AAA server 20 may have previously authenticated each of these devices, or the trust relationship 25A, 25B and 25C may have been statically configured.

Next, at some point after receiving the Session Key 64, the CMTS 13 cryptographically computes DHCP key 88 using the Session Key 64. In the present embodiment, DHCP key 88 is cryptographically computed using Secure Hash Function version 1 (SHA-1). The following factors are taken into account when executing SHA-1: SHA-1 block size, a length of the string "dhcp", the number of bytes included in the Session Key 64 and the factor hexadecimal 43. Once the CMTS 13 cryptographically computes DHCP key 88, communications 81A and 81B are sent to provide DHCP server 21 and cable modem 14 with the DHCP key 88. In other embodiments the AAA server 20 may cryptographically compute and distribute the DHCP key 88.

In other embodiments, the cable modem 14 may itself derive DHCP key 88 based on the Session Key, using the same derivation algorithm used by the CMTS 13. A DHCP key derived by the cable modem 14 has the same value as a DHCP 88 derived by the CMTS 13 when the cable modem 14 and the CMTS 13 use the same derivation algorithm and associated factors.

Thereafter, cable modem 14 and DHCP server 21 can begin communicating without a drawn out authentication and key distribution process. In other words, the DHCP server 21 can authenticate the cable modem 14 by simply observing DHCP key Message Authentication Code-protected (MAC-protected) communications 82. When the DHCP server 21 determines that the communications 82 are MAC-protected using the secret DHCP key 88, the cable modem 14 is determined to be genuine, and vice versa.

Although the CMTS 13 or the AAA server 20 cryptographically computes only a DHCP key 88 in this example, in other embodiments the CMTS 13 or the AAA server 20 cryptographically computes additional keys such as a message authentication key for messages between the cable modem 14 and a configuration file server and a key for encryption and decryption of a cable modem configuration file. These additional keys may be based on the same factors as the DHCP key 88, except that a length of the strings "auth" and "crypto" are respectively substituted for the length of the string "dhcp" and the factor hexadecimal 43 is respectively substituted with the factors hexadecimal 4C and 4E.

FIG. 9 is a detailed diagram showing how the CMTS in FIG. 2 independently authenticates the cable modem 14 in FIG. 2.

The cable modem 14 may trigger the authentication process by sending an optional EAPoD-Start 140 or any other message. The EAPoD-Start 140, as well as the other communications exchanged between the CMTS 13 and the cable modem 14, may be configured using the DOCSIS/Ethernet/802.1x structure as previously described.

The CMTS 13 receives the EAPoD-Start 140 and sends back an FAP-Request/Authorization 143 including a network certificate 60, which is a X.509 certificate for the CMTS 13 in this example. When the optional EAPoD-Start 140 is omitted, EAP-Request/Authorization 143 initiates the authentication process.

However, before sending back EAP-Request/Authorization 143, and when the CMTS 13 does not include an identity for the cable modem 14, the CMTS 13 may optionally send an EAP-Request/Identity 141 to elicit a response with the identity for the cable modem 14. The cable modem 14 responds back with an EAP-Response/Identity 142 containing a MAC address for the cable modem 14. The optional identity exchange may be omitted when the CMTS 13 already contains the identity for the cable modem 14.

Next, after receiving Request/Authorization 143, the cable modem 14 validates the network certificate 60 using a locally stored X.509 certification chain 66. When the network certificate 60 fails validation, the cable modem 14 does not continue with the process and may alert a user that a fraudulent network device is attempting to communicate with the cable modem 14. In other embodiments, the cable modem 14 may be configured to bypass validating the network certificate 60.

Next, the cable modem 14 may optionally authenticate the network 2 in a similar manner as described with respect to FIG. 3. The cable modem 14 may use any other method of authenticating the CMTS 13.

After any optional network authentication, the cable modem 14 continues the process by sending an EAP-Response/Authorization 144 back to the CMTS 13. The EAP-Response/Authorization 144 includes cable modem identification 61 and a cable modem X.509 certificate 62. The EAP-Response/Authorization 144 also includes a CA certificate whose public key is used to validate a digital signature that signs the CM certificate. In another embodiment, the CM's manufacturer CA certificate 63 may be sent to the CMTS 13 in a separate message exchange.

After the CMTS 13 receives the EAP-Response/Authorization 144, the CMTS 13 compares the cable modem identification 61 and the X.509 certificate 62 to a locally stored certification chain 36. When the cable modem identification 61 and the X.509 certificate 62 fail validation, the CMTS 13 does not continue with the process and may send a failure message to notify the cable modem 14.

When validation is successful, the CMTS 13 sends a locally generated Session Key 64 encrypted in the cable modem's private key to the cable modem 14 in EAP Request/Authorization-Reply 151. The CMTS 13 also stores the Session Key 64 for later use in cryptographically computing additional keys. The cable modem 14 acknowledges successful decryption of the Session Key 64 by sending EAP-Response/Ack 152.

After receiving the EAP-Response/Ack 152, the CMTS 13 sends the EAP-success 155 to the cable modem 14. The EAP-success 155 may be optionally protected by a Hashed Message Authentication Code (HMAC) key. When the EAP-success 155 includes HMAC protection, the cable modem 14 cryptographically computes the HMAC key using the Session Key 64 to access the EAP-success 55.

As explained previously, CMTS 13 also changes the state of the cable modem's 14 logical port from the uncontrolled state to the controlled state in conjunction with sending the success message 155. The result of the state change is that the cable modem 14 is no longer restricted to sending only authorization messages. In other words, the cable modem 14 has been authenticated to send and receive media and other communications over the cable network 2.

In the present embodiment, lifetime information and ciphersuite information for the Session Key 64 are subsequently negotiated using the DOCSIS BPKM protocol. The key lifetime designates an amount of time before the cable modem 14 is required to refresh its Session Key 64. The ciphersuite information designates which encryption and authentication algorithms the cable modem 14 uses when communicating media and other user data.

Figure 10:
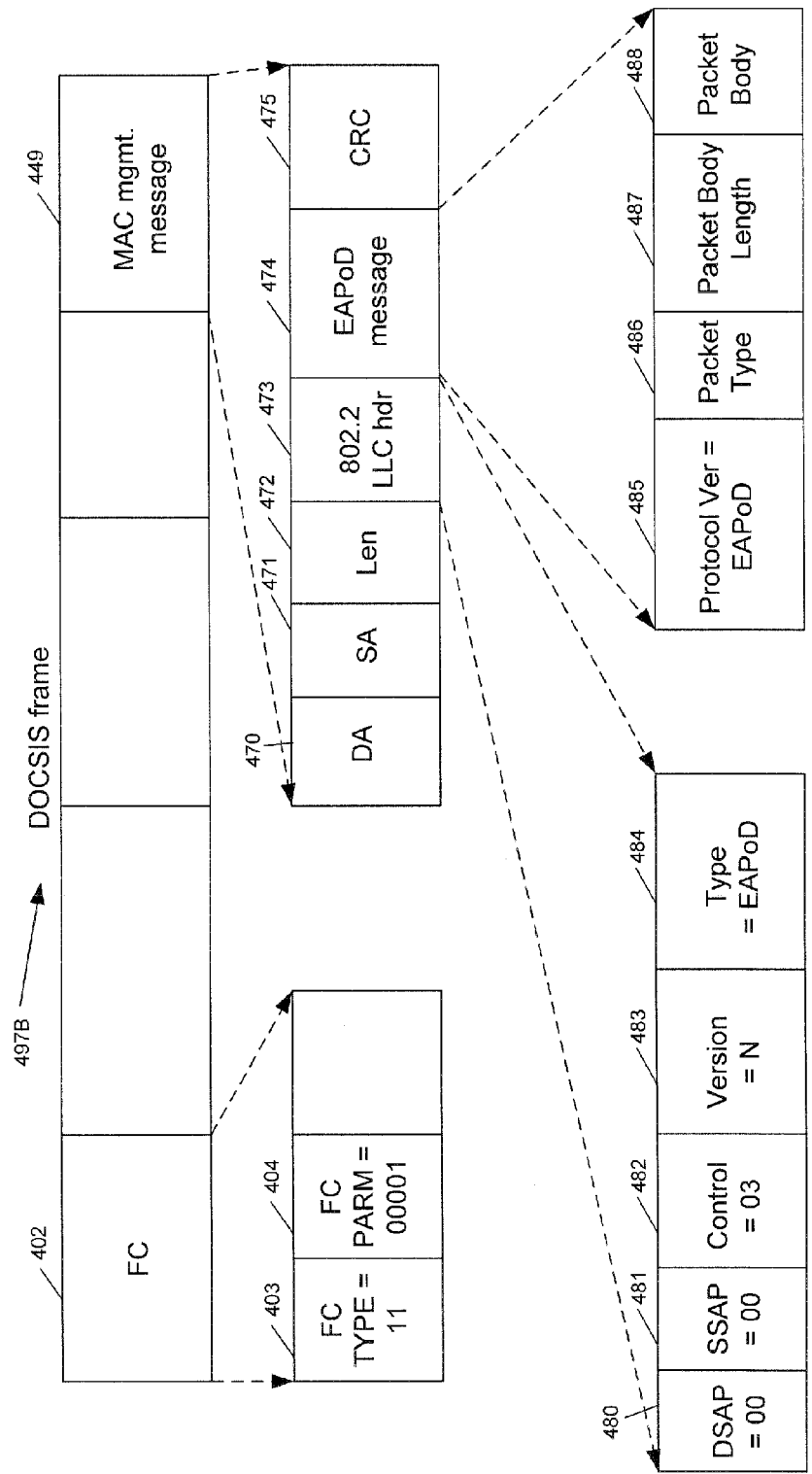
FIG. 10 is a detailed diagram showing an alternate configuration of the frame structure shown in FIG. 4B.

FIG. 10 is a detailed diagram showing an alternate configuration of the frame structure shown in FIG. 4B. The alternate configuration may be used in other embodiments of an improved authentication system for a DOCSIS network.

The alternate DOCSIS frame 497B includes an FC header 402 with FC type 403 and FC parameter 404 fields each set to binary 11 and 00001, respectively, in the MAC header. These fields, 403 and 404, signal a receiving device that the DOCSIS frame 497B includes a DOCSIS MAC management message 449

The MAC management message 449 includes destination address field 470, source address field 471, Len field 472 and CRC field 475. The MAC management message 449 also includes an 802.2 Logical Link Control (LLC) header 473 and an EAPoD message 474.

The 802.2 LLC header 473 includes DSAP and SSAP fields 480 and 481, a control field 482, a version field 483 and a type field 484. The version field 483 is set to value N, which signifies any value other than the conventional versions 1, 2 and 3. The type field 484 is set to "EAPoD", but could be set to any other single byte value that is greater than 31. The EAPoD message 474 includes a protocol version field 485 identifying a version of EAPoD, a packet type field 486, a packet body length field 487 and a packet body 488.

One advantage of using the alternate DOCSIS frame 497B instead of the DOCSIS frame 498A is to distinguish cable modem generated authentication messages from CPE device generated authentication messages. For example, since CPE devices are generally not configured to generate MAC management messages, any DOCSIS frames including the frame structure having the MAC management message corresponds to a cable modem generated message. Of course, when the alternate DOCSIS frame 497B is not used, comparing a source address to a table can also provide that distinction.

FIGS. 11A and 11B are detailed diagrams showing alternate embodiments of a CMTS that provides improved authentication for devices located in cable networks.

The CMTS 1113 provides authentication for cable network devices located in the cable network 2 independently of any existing constructs or authentication criteria associated with conventional cable network device authentication methods such as BPI+. The CMTS 1113 provides authentication according to either local authentication software 1129 (FIG. 11A) or centralized authentication software 1128 (FIG. 11B).

For example, when providing local authentication in FIG. 11A, the CMTS 1113 exchanges authentication messages 1103A and 1104A over the cable network 2 to gather authentication criteria. The authentication messages 1103A and 1104A are structured as a DOCSIS frame 1109A that includes an EAP-based authentication message 1110A, which may be an 802.1x packet. The CMTS 1113 uses authentication criteria received via the authentication messages 1103A and 1104A to authenticate the device located in the cable network. The CMTS 1113 may send an additional message notifying the device of successful authentication.

When providing centralized authentication in FIG. 11B, the CMTS 1113 sends authentication messages 1103B and 1104B over the cable network 2 to gather authentication criteria. The authentication messages 1103B and 1104B are structured as a DOCSIS frame 1109B that includes an EAP-based authentication message 1110B, which may be an 802.1x packet. The CMTS 1113 extracts at least one EAP-based authentication message 1110B from a DOCSIS frame 1109B for forwarding over packet switched network 74.

Next, the CMTS 1113 sends the extracted EAP-based authentication message 1110 that includes the authentication criteria over the packet switched network to a server as part of one or more authentication messages 1101 and 1102. These authentication messages 1101 and 1102 may provide a notification of successful authentication to either or both of the CMTS 1113 and the cable network device.

In summary, the alternate embodiments shown in FIGS. 11A and 11B make it clear that various other examples of the invention besides the example shown in FIGS. 2-9 are also possible and practical. Thus, embodiments having limited or no correspondence to existing conventional authentication constructs and criteria used in conventional cable network device authentication, such as BPI+, are also possible and practical.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method, comprising:
    receiving at a Cable Modem Termination System (CMTS) a proactively generated and transmitted authentication request from a cable modem, said authentication request including an attribute specifying a physical address of the cable modem and initiating an authentication process involving the cable modem, the CMTS, and a centralized server, wherein the authentication process is initiated by the cable modem generating and transmitting the authentication request;
    as part of the authentication process initiated by the cable modem, forwarding at least a portion of said authentication request to the centralized server to cause a network certificate to be received by the cable modem;
    as part of the authentication process initiated by the cable modem, after the network certificate is received by the cable modem, receiving at the CMTS an authorization response from the cable modem, wherein the authorization response includes an authentication criterion for the cable modem;
    as part of the authentication process initiated by the cable modem, extracting a forwarding message from the authorization response and sending the forwarding message to the centralized server;
    as part of the authentication process initiated by the cable modem, receiving back a communication to establish a session key on the cable modem and forwarding a representation of the communication to the cable modem for establishment of the session key on the cable modem;
    completing ranging with the cable modem before sending a certificate request that elicits the authorization response; and
    registering the cable modem after the authentication process.

2. The method of claim h further comprising forwarding an acknowledgement to the centralized server, the acknowledgement indicating that the cable modem successfully established the session key using private credentials stored on the cable modem.

3. The method of claim 1, further comprising:
    receiving a request for the authentication criterion from the centralized server, the request including the network identity; and
    forwarding a representation of the request for the authentication criterion to the cable modem to elicit the authorization response.

4. The method of claim 3, further comprising:
    identifying a Remote Authentication Dial In User Service (RADIUS) message included in the request for the authentication criterion before forwarding the representation of the request, the RADIUS message containing an Extensible Authentication Protocol (EAP) packet that contains the network identity;
    extracting the EAP packet;
    formatting the EAP packet; and
    sending the formatted EAP packet containing the network identity to the cable modem.

5. The method of claim 4, further comprising:
    cryptographically computing an authentication key using the session key; and
    sending the authentication key to a Dynamic Host Configuration Protocol (DHCP) server.

6. The method of claim 1, further comprising:
    receiving a downstream device credential request from the centralized server, the downstream device credential request including the network identity;
    forwarding the downstream device credential request to a downstream device operating behind the cable modem; and
    receiving back a downstream device response from the downstream device that includes authentication credentials associated with the downstream device.

7. The method of claim 6, further comprising:
    stripping a Data Over Cable Service Interface Specification (DOCSIS) frame from the downstream device response;
    forwarding a remaining portion of the downstream device response to the centralized server; and
    receiving back an authentication success for the downstream device.

8. The method of claim 1, wherein the authorization response includes a DOCSIS frame containing an Ethernet frame that contains an 802.1x packet.

9. A Cable Modem Termination System (CMTS), comprising:
    a processing device; and a memory coupled to the processing device comprising instructions executable by the processing device, the processing device operable when executing the instructions to:

receive at the CMTS a proactively generated and transmitted authentication request from a remote device over the cable network, said authentication request initiating an authentication process involving the remote device, the CMTS, and a centralized server, wherein the authentication process is initiated by the remote device generating and transmitting the authentication request;

as part of the authentication process initiated by the remote device, forward at least a portion of said authentication request to the centralized server to cause a network certificate to be received by the remote device;

as part of the authentication process initiated by the remote device, receive an authorization response over the cable network, wherein the authorization response includes a device identification for the remote device and an authentication criterion;

as part of the authentication process initiated by the remote device, extract a forwarding message from the authorization response and send the forwarding message to the centralized server; and as part of the authentication process initiated by the remote device, receive back an authorization message to establish a session key on the remote device and forward a representation of the authorization message to the remote device;

wherein the remote device is a cable modem, and wherein the processing device is operable when executing the instructions to:

complete ranging with the remote device before sending a certificate request that elicits the authorization response; and register the remote device as an authenticated cable modem after authenticating the remote device.

10. The CMTS of claim 9, wherein the processing device is operable when executing the instructions to forward an acknowledgement indicating that the remote device successfully established the session key using private credentials stored on the remote device.

11. The CMTS of claim 9, wherein the processing device is operable when executing the instructions to remove a Remote Authentication Dial In User Service (RADIUS) or Diameter header from the authorization message before sending the representation of the authorization message to the remote device.

12. The CMTS of claim 9, wherein the processing device is operable when executing the instructions to:
   extract both the session key and an Extensible Authentication Protocol (EAP) success from the authorization message;
   computationally compute a Hashed Message Authentication Code (HMAC) key using the session key;
   integrity-protect the EAP success using the HMAC key; and
   send the integrity-protected EAP success to the remote device.

13. The CMTS of claim 9, wherein the processing device is operable when executing the instructions to authenticate a Customer Premise Equipment (CPE) device operating behind the cable modem.

* * * * *

UNITED STATES PATENT AND TRADEMARK OFFICE
CERTIFICATE OF CORRECTION

| | | |
|---|---|---|
| PATENT NO. | : 7,865,727 B2 | |
| APPLICATION NO. | : 11/467002 | |
| DATED | : January 4, 2011 | |
| INVENTOR(S) | : Zeng et al. | |

It is certified that error appears in the above-identified patent and that said Letters Patent is hereby corrected as shown below:

At column 14, line 13, please replace "claim h" with --claim 1--.
At column 14, line 65, please replace "comprising;" with --comprising:--.

Signed and Sealed this
Ninth Day of August, 2011

David J. Kappos
*Director of the United States Patent and Trademark Office*